US012785425B2

(12) United States Patent
Mizoshita et al.

(10) Patent No.: US 12,785,425 B2
(45) Date of Patent: Nov. 3, 2026

(54) BATTERY PACK FOR ELECTRIC BICYCLE AND ELECTRIC BICYCLE EQUIPPED WITH BATTERY PACK

(71) Applicant: SANYO Electric Co., Ltd., Kadoma (JP)

(72) Inventors: Shingo Mizoshita, Moriguchi (JP); Hidetaka Arai, Moriguchi (JP); Toru Nishikawa, Moriguchi (JP); Kazuya Maegawa, Moriguchi (JP); Hiroki Teraoka, Moriguchi (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 876 days.

(21) Appl. No.: 17/914,558

(22) PCT Filed: Mar. 24, 2021

(86) PCT No.: PCT/JP2021/012180
§ 371 (c)(1),
(2) Date: Sep. 26, 2022

(87) PCT Pub. No.: WO2021/200441
PCT Pub. Date: Oct. 7, 2021

(65) Prior Publication Data

US 2023/0146313 A1 May 11, 2023

(30) Foreign Application Priority Data

Mar. 30, 2020 (JP) ................................ 2020-061486

(51) Int. Cl.
*H02J 7/60* (2026.01)
*B60L 58/12* (2019.01)
(Continued)

(52) U.S. Cl.
CPC .............. *H02J 7/663* (2026.01); *B60L 58/12* (2019.02); *H02J 7/60* (2026.01); *H02J 7/61* (2026.01);
(Continued)

(58) Field of Classification Search
CPC .... H02J 7/0031; H02J 7/0029; H02J 7/00302; H02J 7/00304; H02J 7/0049; H02J 7/00712; H02J 7/007182; B60L 58/12
(Continued)

(56) References Cited

U.S. PATENT DOCUMENTS 5,982,145 A * 11/1999 Eguchi .................. H02J 7/0068 320/136
6,150,794 A * 11/2000 Yamada ................ B60L 53/126 320/108
(Continued)

FOREIGN PATENT DOCUMENTS

CN 101800340 A 8/2010
CN 109247055 A 1/2019
(Continued)

OTHER PUBLICATIONS

EPO_Machine_Translation of JPH0950826A (Year: 1997).*
(Continued)

*Primary Examiner* — John T Trischler

(57) ABSTRACT

A battery pack includes a rechargeable battery, a charge FET including a parallel diode connected in series with the battery, and a control circuit configured to control turning on and off of the charge FET. The control circuit includes a discriminating circuit configured to detect a bicycle-mounted state and a charger-connected state, and a memory configured to store a full charge voltage of the battery. The control circuit is configured to, while the discriminating circuit detects the bicycle-mounted state, turn off the charge
(Continued)

FET. The control circuit is configured to, while the discriminating circuit detects the charger-connected state, stop charging the battery by switching the charge FET to turn off the charge FET upon detecting that a voltage of the battery charged by a charger becomes higher than the full charge voltage.

11 Claims, 5 Drawing Sheets

(51) Int. Cl.

| | |
|---|---|
| ***H02J 7/61*** | (2026.01) |
| ***H02J 7/62*** | (2026.01) |
| ***H02J 7/82*** | (2026.01) |
| ***H02J 7/90*** | (2026.01) |
| ***H02J 7/96*** | (2026.01) |
| *B60L 7/10* | (2006.01) |
| *B60L 53/20* | (2019.01) |
| *B62M 6/40* | (2010.01) |
| *B62M 6/90* | (2010.01) |
| *H01M 10/42* | (2006.01) |
| *H01M 10/46* | (2006.01) |
| *H01M 10/48* | (2006.01) |
| *H02J 7/14* | (2006.01) |

(52) U.S. Cl.

CPC ................ *H02J 7/62* (2026.01); *H02J 7/825* (2026.01); *H02J 7/933* (2026.01); *H02J 7/96* (2026.01); *B60L 7/10* (2013.01); *B60L 53/20* (2019.02); *B60L 2200/12* (2013.01); *B60L 2210/30* (2013.01); *B62M 6/40* (2013.01); *B62M 6/90* (2013.01); *H01M 10/425* (2013.01); *H01M 2010/4271* (2013.01); *H01M 10/46* (2013.01); *H01M 10/48* (2013.01); *H01M 2220/20* (2013.01); *H02J 7/1415* (2013.01); *H02J 2207/40* (2020.01); *Y02T 10/7072* (2013.01)

(58) Field of Classification Search

USPC .......................................................... 320/134

See application file for complete search history.

(56) References Cited

U.S. PATENT DOCUMENTS

| | | | | |
|---|---|---|---|---|
| 6,686,722 | B2 * | 2/2004 | Watanabe | H01M 50/583 320/112 |
| 7,264,760 | B2 * | 9/2007 | Kawabata | H01M 50/555 320/112 |
| 7,396,600 | B2 * | 7/2008 | Watanabe | H01M 50/583 429/61 |
| 7,570,014 | B2 * | 8/2009 | Teraoka | H02J 7/00047 320/106 |
| 7,605,568 | B2 * | 10/2009 | Gangstoe | H02J 7/0029 320/128 |
| 7,642,007 | B2 * | 1/2010 | Tamai | H01M 10/425 29/623.2 |
| 7,642,747 | B2 * | 1/2010 | Morioka | H01M 10/441 320/112 |
| 7,675,263 | B2 * | 3/2010 | Kawasumi | H01M 50/583 429/96 |
| 7,923,967 | B2 * | 4/2011 | Hamaguchi | H02J 7/005 320/136 |
| 7,928,692 | B2 * | 4/2011 | Carrier | H02J 7/0013 320/124 |
| 8,138,721 | B2 * | 3/2012 | Yang | H02J 7/00306 320/132 |
| 8,179,139 | B2 * | 5/2012 | Kawasumi | H01M 50/574 324/426 |
| 8,179,650 | B2 * | 5/2012 | Watanabe | H01M 10/482 361/93.1 |
| 8,203,309 | B2 * | 6/2012 | Maegawa | H02J 7/342 320/128 |
| 8,344,687 | B2 * | 1/2013 | Nishikawa | H01M 10/42 320/132 |
| 8,450,975 | B2 * | 5/2013 | Kim | H01M 10/488 320/136 |
| 8,574,735 | B2 * | 11/2013 | Matsuura | H01M 10/48 429/90 |
| 8,587,254 | B2 * | 11/2013 | Kobayashi | H01M 10/443 320/137 |
| 8,593,112 | B2 * | 11/2013 | An | H01M 10/42 320/135 |
| 8,766,599 | B2 * | 7/2014 | Kim | H02J 7/0068 320/136 |
| 8,816,613 | B2 * | 8/2014 | Lee | B60L 3/0046 318/140 |
| 8,952,561 | B2 * | 2/2015 | Seol | B62M 6/90 307/9.1 |
| 8,952,660 | B2 * | 2/2015 | Zhang | H01M 10/4207 320/134 |
| 9,102,317 | B2 * | 8/2015 | Spelta | B60L 50/66 |
| 9,112,244 | B2 * | 8/2015 | Nishida | H01M 10/425 |
| 9,123,977 | B2 * | 9/2015 | Nishikawa | H02J 7/0013 |
| 9,166,421 | B2 * | 10/2015 | Tsuruta | H02J 7/663 |
| 9,231,419 | B2 * | 1/2016 | Kato | H02J 7/00711 |
| 9,350,189 | B2 * | 5/2016 | Kim | B60L 58/15 |
| 9,479,002 | B2 * | 10/2016 | An | H02J 7/0068 |
| 9,505,310 | B2 * | 11/2016 | Kronfeld | B60L 3/0061 |
| 9,954,212 | B2 * | 4/2018 | Kagami | B60L 58/26 |
| 9,956,880 | B2 * | 5/2018 | Kronfeld | B60L 50/20 |
| 10,059,220 | B2 * | 8/2018 | Ro | B60L 50/51 |
| 10,158,237 | B2 * | 12/2018 | Seo | H02J 7/00309 |
| 10,710,526 | B2 * | 7/2020 | Kawauchi | H02J 7/007188 |
| 10,807,475 | B2 * | 10/2020 | Carmignani | G01S 19/16 |
| 10,857,894 | B2 * | 12/2020 | Hosaka | B60L 53/16 |
| 10,870,355 | B2 * | 12/2020 | Tanaka | H02P 21/36 |
| 11,114,881 | B2 * | 9/2021 | Jeong | H01M 10/44 |
| 11,158,915 | B2 * | 10/2021 | Takada | H01M 10/486 |
| 11,205,912 | B2 * | 12/2021 | Osada | H10B 12/00 |
| 11,211,812 | B2 * | 12/2021 | Zhang | H02J 7/0071 |
| 11,394,228 | B2 * | 7/2022 | Seol | H01M 10/44 |
| 11,699,915 | B2 * | 7/2023 | Zhang | H02J 7/0071 320/134 |
| 11,799,430 | B2 * | 10/2023 | Takahashi | H03F 3/45179 |
| 11,923,707 | B2 * | 3/2024 | Yamazaki | H02J 7/0031 |
| 11,955,823 | B2 * | 4/2024 | Zhang | H02J 7/00306 |
| 12,062,932 | B2 * | 8/2024 | Kuranuki | B60L 50/60 |
| 12,081,056 | B2 * | 9/2024 | Zhang | H02J 7/0047 |
| 2002/0140401 | A1 * | 10/2002 | Watanabe | H01M 50/581 320/134 |
| 2003/0003357 | A1 * | 1/2003 | Tamai | H01M 50/176 29/623.2 |
| 2003/0141841 | A1 * | 7/2003 | Kawabata | H01M 10/0436 320/112 |
| 2004/0115519 | A1 * | 6/2004 | Lee | H01M 10/425 429/61 |
| 2005/0053827 | A1 * | 3/2005 | Watanabe | H01M 50/581 429/61 |
| 2007/0159135 | A1 * | 7/2007 | Teraoka | H02J 7/00036 320/112 |
| 2007/0188141 | A1 * | 8/2007 | Hamaguchi | H02J 7/005 320/128 |
| 2007/0188148 | A1 * | 8/2007 | Kawasumi | H02J 7/0031 320/134 |
| 2007/0210757 | A1 * | 9/2007 | Gangstoe | H02J 7/0069 320/130 |
| 2007/0229026 | A1 * | 10/2007 | Morioka | H02J 7/0031 320/112 |
| 2008/0023234 | A1 * | 1/2008 | Wang | B62M 7/14 280/204 |
| 2008/0285193 | A1 * | 11/2008 | Watanabe | H01M 10/482 361/88 |
| 2009/0176146 | A1 * | 7/2009 | Matsuura | H02J 7/0013 429/90 |

(56) References Cited

U.S. PATENT DOCUMENTS

2009/0295332 A1* 12/2009 Yang .................. H02J 7/00306 320/132
2010/0194398 A1* 8/2010 Kawasumi ............ H01M 10/42 324/430
2010/0213891 A1* 8/2010 Nishikawa ............ H01M 10/42 320/106
2010/0213900 A1* 8/2010 Carrier ................ H02J 7/00036 320/134
2010/0237828 A1* 9/2010 Maegawa ............. H02J 7/0018 320/118
2011/0095623 A1* 4/2011 Doh ......................... B62M 6/90 307/119
2011/0101921 A1* 5/2011 An ........................ H01M 10/44 320/128
2011/0181233 A1* 7/2011 Mino .................... H02J 7/0045 320/101
2012/0032643 A1* 2/2012 Yun ..................... H01M 10/441 429/7
2012/0049804 A1* 3/2012 Kobayashi .......... H01M 10/443 320/150
2012/0133310 A1* 5/2012 Lee ....................... H02J 7/0024 320/117
2012/0146429 A1* 6/2012 Seol ......................... B62M 6/90 307/116
2012/0268059 A1* 10/2012 Nishikawa .......... H02J 7/00304 324/426
2013/0002261 A1* 1/2013 Matsuura .............. H02J 7/0049 429/61
2013/0033231 A1* 2/2013 Zhang ................... H02J 7/0016 320/116
2013/0127424 A1* 5/2013 Tsuruta ................... H02J 7/663 320/136
2013/0249492 A1* 9/2013 Kim ...................... H01M 10/48 320/128
2014/0004390 A1* 1/2014 Nishida ............... H01M 50/528 429/7
2014/0035534 A1* 2/2014 An ........................ H01M 10/44 320/134
2014/0062351 A1* 3/2014 Spelta ................. B60L 15/2054 318/139
2014/0203762 A1* 7/2014 Kato .................... H02J 7/00711 320/107
2014/0353055 A1* 12/2014 Kronfeld .................. B62M 6/40 701/22
2016/0079789 A1* 3/2016 Kato ................. H02J 7/007184 320/162
2016/0233474 A1* 8/2016 Kagami ............ H01M 10/0525
2016/0332532 A1* 11/2016 Ro .......................... H02J 9/002
2017/0005493 A1* 1/2017 Seo ..................... H02J 7/00308
2017/0158061 A1* 6/2017 Kronfeld ............. B60L 15/2009
2017/0279106 A1* 9/2017 Takada .............. H01M 10/0585
2017/0313194 A1* 11/2017 Carmignani ............ G01S 19/34
2018/0222332 A1 8/2018 Hosaka et al.
2019/0031126 A1* 1/2019 Kawauchi ........... H01M 50/574
2019/0084426 A1* 3/2019 Tanaka ....................... B60L 7/22
2019/0326648 A1* 10/2019 Lee .................. G01R 19/16542
2019/0356138 A1* 11/2019 Seol ....................... H01M 10/44
2020/0099229 A1* 3/2020 Jeong ............... G01R 19/16519
2020/0153264 A1* 5/2020 Osada ................ H10D 84/0126
2020/0350777 A1* 11/2020 Zhang ................... H02J 7/0047
2022/0052535 A1* 2/2022 Yamazaki ............. H02J 7/0031
2022/0077704 A1* 3/2022 Zhang ................... H02J 7/0013
2022/0085630 A1* 3/2022 Zhang ................. H02J 7/00716
2022/0109195 A1* 4/2022 Morimoto ........... H01M 10/441
2022/0294402 A1* 9/2022 Takahashi ............ H03K 5/2472
2023/0074610 A1* 3/2023 Ochiai .................. H01M 4/043
2023/0100524 A1* 3/2023 Ikeda ................... H10D 84/038 429/7
2023/0129659 A1* 4/2023 Abe ...................... H01M 4/505 252/182.1
2023/0141951 A1* 5/2023 Kadoma ............. H01M 10/058 429/317
2023/0155401 A1* 5/2023 Kuranuki .............. H01M 10/46
2023/0216093 A1* 7/2023 Kim .................... H01M 10/425 429/90
2023/0299602 A1* 9/2023 Zhang ................... H02J 7/0047 320/134
2023/0336006 A1* 10/2023 Kobayashi ............ H02J 7/0031
2023/0378459 A1* 11/2023 Kuriki ................... H01M 4/525
2023/0408595 A1* 12/2023 Ikeda ................ H01M 10/4264
2024/0106249 A1* 3/2024 Suyama ................... H02H 7/18
2024/0109618 A1* 4/2024 Sessions ................. B60L 50/64
2024/0204329 A1* 6/2024 Kao ...................... H01M 10/46

FOREIGN PATENT DOCUMENTS

EP 3460989 A1 3/2019
JP 9-50826 A 2/1997
JP 2008-108567 A 5/2008
JP 2014045551 A * 3/2014
JP 2015-144538 A 8/2015
JP 2017-46400 A 3/2017
JP 2017-103871 A 6/2017
WO 2017/199661 A1 11/2017

OTHER PUBLICATIONS

International Search Report dated Jun. 29, 2021, issued in counterpart International Application No. PCT/JP2021/012180 (2 pages).
Extended (Supplementary) European Search Report dated Sep. 4, 2023, issued in counterpart EP Application No. 21779389.2. (10 pages).
English Translation of Office Action dated Dec. 25, 2025, issued in counterpart CN Application No. 202180007951.X.(5 pages).

* cited by examiner

BATTERY PACK FOR ELECTRIC BICYCLE AND ELECTRIC BICYCLE EQUIPPED WITH BATTERY PACK

TECHNICAL FIELD

The present invention relates to a battery pack configured to supply electric power to a driving motor of an electric bicycle, and an electric bicycle equipped with the battery pack.

BACKGROUND ART

Electric bicycles, which are equipped with a driving motor for driving a wheel, supply electric power from a battery to the driving motor so that a rider can drive it easily. As the electric bicycle of this type, an electric bicycle has been developed including a circuit for charging a battery pack by regenerative braking during braking (PTL 1).

The electric bicycle described in PTL 1 allows the battery to be charged while ensuring reserve charging capacity in order to decelerate the bicycle by regenerative braking without causing uncomfortable feeling to the rider. The battery that has been charged while leaving the reserve charging capacity can still be charged by regenerative braking until it is fully charged, thereby allowing the bicycle to smoothly travel a long downhill slope, for example, while performing regenerative braking.

CITATION LIST

Patent Literature

PTL 1: Japanese Patent Laid-Open Publication No. 2017-103871

SUMMARY

Technical Problem

The method of charging the battery while ensuring extra charging capacity has the disadvantage that the travel range offered by the battery is reduced because the battery is not fully charged. Moreover, because the bicycle is used under various travelling conditions, the charging current to the battery from the driving motor may significantly fluctuate, causing the battery to be charged momentarily with a large current. When the battery is charged with a large current, the voltage increases abruptly, causing various kinds of adverse effects on the battery.

The present invention has been developed in order to solve the foregoing and other problems. An object of the present invention is to provide an electric bicycle battery pack that can limit a voltage increase due to the charging current from the driving motor to prevent the battery deterioration resulting from the voltage increase and can further ensure sufficient safety, and to provide an electric bicycle that is equipped with the battery pack.

Solution to Problem

A battery pack according to a first aspect of the invention includes a rechargeable battery, a charge FET including a parallel diode connected in series with the battery, and a control circuit configured to control turning on and off of the charge FET. The control circuit includes a discriminating circuit configured to detect a bicycle-mounted state and a charger-connected state and a memory configured to store a full charge voltage of the battery. The control circuit is configured to, while the discriminating circuit detects the bicycle-mounted state. turn off the charge FET, thereby preventing the battery from being charged with an electromotive force of the driving motor. The control circuit is configured to, while the discriminating circuit detects the charger-connected state, stop charging the battery by switching the charge FET to turn off the charge FET upon detecting that a voltage of the battery charged by a charger becomes higher than the full charge voltage.

A battery pack according to a second aspect of the invention includes a rechargeable battery, a charge FET including a parallel diode connected in series with the battery, and a control circuit configured to turning on and off of controlling the charge FET. The control circuit includes a discriminating circuit configured to detect a bicycle-mounted state and a charger-connected state and a memory configured to store a full charge voltage of the battery and a threshold voltage lower than the full charge voltage. The control circuit is configured, while the discriminating circuit detects the bicycle-mounted state, to: turn off the charge FET while a voltage of the battery is higher than the threshold voltage, thereby preventing the battery from being charged with an electromotive force of the driving motor and having a voltage higher than the full charge voltage; and turn on the charge FET while the voltage of the battery is lower than the threshold voltage since the battery is prevented from being charged with an electromotive force of the driving motor and having a voltage higher than the full charge voltage. The control circuit is configured, while the discriminating circuit detects the charger-connected state, to stop charging the battery by switching the charge FET to turn off the charge FET upon detecting that the voltage of the battery charged by a charger becomes higher than the full charge voltage.

A battery pack according to a third aspect of the invention includes a rechargeable battery, a charge FET including a parallel diode connected in series with the battery, and a control circuit configured to control turning on and off of the charge FET. The control circuit includes a discriminating circuit configured to detect a bicycle-mounted state and a charger-connected state and a memory configured to store a full charge voltage of the battery and a threshold current of a load current. The control circuit is configured, while the discriminating circuit detects the bicycle-mounted state, to: turn off the charge FET when the load current is smaller than the threshold current, thereby preventing the battery from being charged with an electromotive force of the driving motor and having a voltage higher than the full charge voltage; and turn on the charge FET when the load current is larger than the threshold current since the battery is prevented from being charged with an electromotive force of the driving motor and having a voltage higher than the full charge voltage. The control circuit is configured, while the discriminating circuit detects the charger-connected state, to stop charging the battery by switching the charge FET to turn off the charge FET upon detecting that the voltage of the battery charged by a charger is higher than the full charge voltage.

An electric bicycle according to an aspect of the present invention includes one of the battery packs and a driving motor connected to the battery pack via a control converter. The driving motor configured to supply a charging current to the battery pack during regenerative braking of the bicycle.

An electric bicycle according to another aspect of the present invention includes one of the battery packs, a driving motor connected to the battery pack via a control converter, and a regenerative braking power generating mechanism configured to charge the battery pack with an electromotive force of the driving motor.

Advantageous Effects of Invention

The electric bicycle battery packs according to the present invention can limit a voltage increase due to the charging current from the driving motor to prevent the battery deterioration resulting from the voltage increase, and can further ensure sufficient safety.

DESCRIPTION OF EMBODIMENTS

Figure 1:
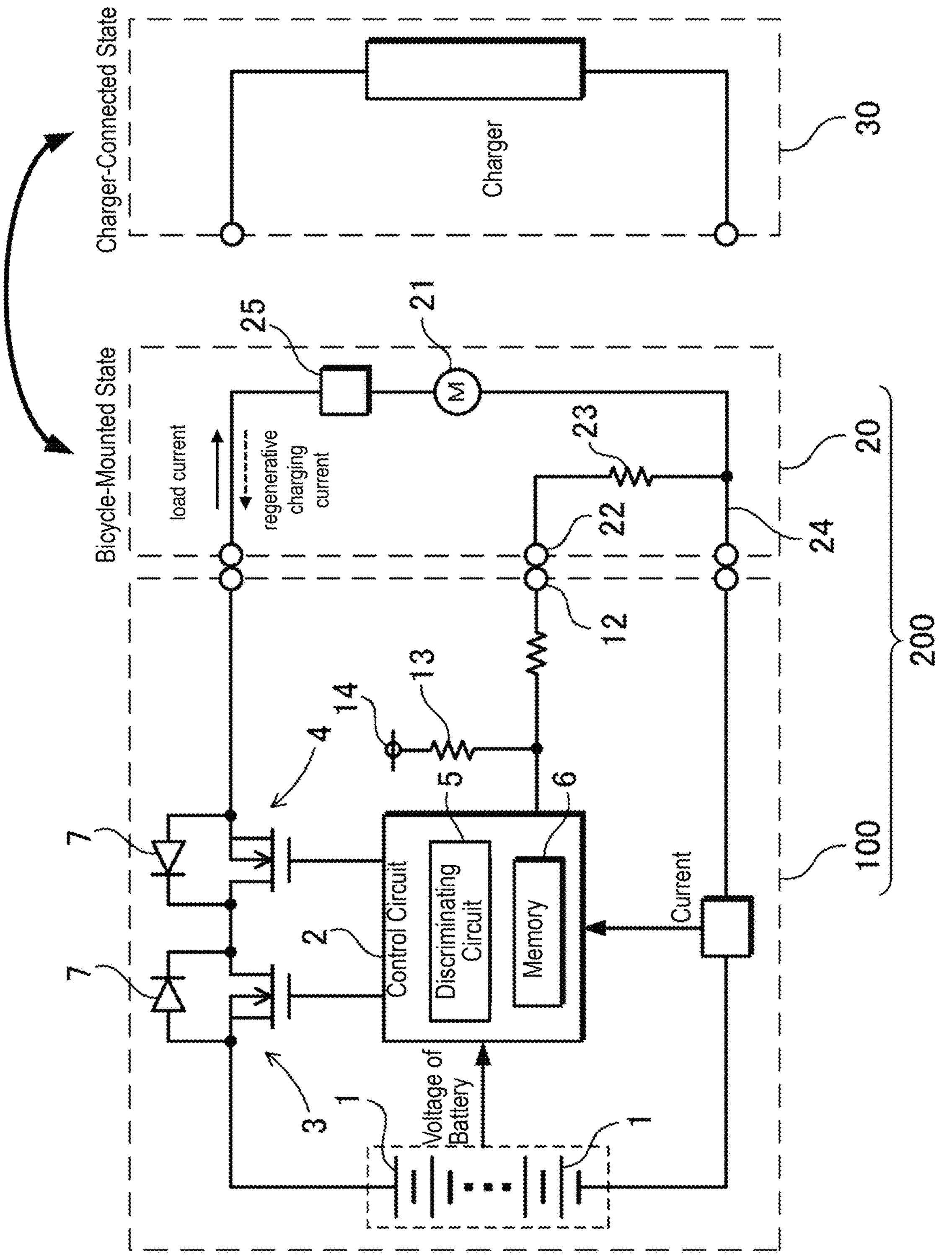
FIG. 1 is a block diagram of an electric bicycle battery pack according to an exemplary embodiment of the present invention.

Embodiments of the present invention may be embodied by the following configurations.

A battery pack for a n electric bicycle according to a first exemplary aspect of the present invention includes a rechargeable battery, a charge FET including a parallel diode connected in series with the battery, and a control circuit configured to control turning on and off of the charge FET. The control circuit includes a discriminating circuit configured to detect a bicycle-mounted state and a charger-connected state and a memory configured to store a full charge voltage of the battery. The control circuit is configured to, while the discriminating circuit detects the bicycle-mounted state, turn off the charge FET. The control circuit is configured to, while the discriminating circuit detects the charger-connected state, stop charging the battery by switching the charge FET to turn off the charge FET upon detecting that a voltage of the battery charged by a charger becomes higher than the full charge voltage.

The above electric bicycle battery pack turns off the charge FET in the bicycle-mounted state of being mounted on the bicycle. The charge FET connected to a parallel diode, such as a parasitic diode, causes electric power to be supplied from the battery to the driving motor even when the charge FET is turned off. While the battery pack is mounted on the bicycle, the battery pack prohibits the battery from being charged by the electromotive force of the driving motor while allowing the battery to supply electric power to the driving motor. When the battery pack is mounted on the bicycle and charged by the electromotive force of the driving motor so that the battery voltage exceeds the full charge voltage, deterioration of the battery is accelerated and safety is lowered. The battery pack switches the charge FET to turn off the charge FET while the battery pack is mounted on the bicycle prohibits the battery from being charged by the electromotive force of the driving motor while the battery pack is mounted on the bicycle. Therefore, the battery pack prevents deterioration of a battery resulting from the electromotive force of the driving motor when mounted on the bicycle, thus ensuring sufficient safety.

A battery pack for an electric bicycle according to a second exemplary aspect of the present invention includes a rechargeable battery, a charge FET including a parallel diode connected in series with the battery, and a control circuit configured to turning on and off of controlling the charge FET. The control circuit includes a discriminating circuit configured to detect a bicycle-mounted state and a charger-connected state and a memory configured to store a full charge voltage of the battery and a threshold voltage lower than the full charge voltage. The control circuit is configured, while the discriminating circuit detects the bicycle-mounted state, to: turn off the charge FET while a voltage of the battery is higher than the threshold voltage; and turn on the charge FET while the voltage of the battery is lower than the threshold voltage. The control circuit is configured, while the discriminating circuit detects the charger-connected state, to stop charging the battery by switching the charge FET to turn off the charge FET upon detecting that the voltage of the battery charged by a charger becomes higher than the full charge voltage.

The above battery pack turns off the charge FET in the bicycle-mounted state in which the battery pack is mounted on the bicycle so as to prohibit the battery from being charged by the electromotive force of the driving motor when the battery voltage is higher than the threshold voltage which is predetermined to be a voltage lower than the full charge voltage. Therefore, although the battery is charged by the electromotive force of the driving motor in the state where the battery voltage is low, the battery voltage does not exceed the full charge voltage in that state, so that battery deterioration can be prevented and sufficient safety can be ensured. When the battery voltage is lower than the threshold voltage, the charge FET is turned on to permit charging by the electromotive force of the driving motor. However, the threshold voltage may be set to a voltage at which the battery is charged by the electromotive force but does not exceed the full charge voltage. Therefore, even when the battery is charged by the electromotive force of the driving motor while the battery voltage is lower than the threshold voltage, the battery voltage does not exceed the full charge voltage, so that battery deterioration is prevented and safety is ensured.

A battery pack for an electric bicycle according to a third exemplary aspect of the present invention includes a rechargeable battery, a charge FET including a parallel diode connected in series with the battery, and a control circuit configured to control turning on and off of the charge FET. The control circuit includes a discriminating circuit configured to detect a bicycle-mounted state and a charger-connected state and a memory configured to store a full charge voltage of the battery and a threshold current of a load current. The control circuit is configured, while the discriminating circuit detects the bicycle-mounted state, to: turn off the charge FET when the load current is smaller than the threshold current; and turn on the charge FET when the load current is larger than the threshold current. The control circuit is configured, while the discriminating circuit detects the charger-connected state, to stop charging the battery by switching the charge FET to turn off the charge FET upon detecting that the voltage of the battery charged by a charger is higher than the full charge voltage.

In the bicycle-mounted state of being mounted on the bicycle, the above battery pack turns off the charge FET state when the load current is smaller than the threshold current, but turns on the charge FET when the load current is larger than the threshold current. The charge FET connected to a parallel diode allows electric power to be supplied from the battery to the driving motor via the parallel diode when the charge FET is turned off. While the charge FET is turned off and electric power is supplied via the parallel diode, a voltage drop occurs due to the parallel diode. The voltage drop due to the parallel diode is larger than the voltage drop due to the FET which is turned on. An ordinary diode provides the voltage drop of about 0.6 V. In contrast, the internal resistance of the FET which is turned on is significantly small, about several milliohms, so the FET produces a smaller voltage drop than the parallel diode when electric current passes through. The parallel diode, which causes a larger voltage drop, produces electric power loss increasing proportionally to a current. Therefore, a large current supplied from the battery to the driving motor increases electric power loss in the charge FET which is turned off. The above battery pack turns on the charge FET when the load current is larger than the threshold current, so the battery pack may reduce electric power loss due to the charge FET when the large current is supplied from the battery to the driving motor.

In a bicycle battery pack according to a fourth exemplary aspect of the present invention, the control circuit includes an A/D converter configured to convert the voltage of the battery into a digital signal. The control circuit is configured to calculate the voltage of the battery by processing the digital signal converted by the A/D converter.

In a battery pack according to a fifth exemplary aspect of the present invention, the charge FET is a MOSFET including a parasitic diode as the parallel diode.

In an electric bicycle battery pack according to a sixth exemplary aspect of the present invention, the rechargeable battery is a lithium-ion battery.

An electric bicycle according to a seventh exemplary aspect of the present invention includes one of the above battery packs and a driving motor connected to the battery pack via a control converter, the driving motor configured to supply a charging current to the battery pack during regenerative braking of the bicycle.

The present invention will be detailed below with reference to the drawings. Although the following description uses directional terms and positional terms (for example, "upward," "downward," and other terms including these words) to indicate specific directions and positions as needed, such terms are merely used to facilitate understanding of the invention with reference to the drawings and are intended to limit the technical scope of the present invention. In addition, the same reference signs used throughout the drawings indicate the same or like parts and components.

The following exemplary embodiments are merely examples of the technical idea of the present invention, and therefore do not limit the present invention to the following exemplary embodiments. Moreover, the dimensions, materials, shapes, relative arrangements, and the like of parts and elements described in the following are intended for illustrative purposes only, and should not be construed to limit the scope of the invention, unless specifically stated otherwise. The contents described in one exemplary embodiment or one example may be also applicable to other exemplary embodiments and examples. Furthermore, the sizes of some elements, their positional relationships, and so forth shown in the drawings may be exaggerated for clarity in illustration.

Exemplary Embodiment 1

Electric bicycle battery pack 100 shown in the block diagram of FIG. 1 includes rechargeable battery 1, charge FET 3 including parallel diode 7 connected in series with battery 1, and control circuit 2 configured to control turning on and off of charge FET 3. The block diagram of the drawing also shows bicycle 20 to which battery pack 100 is connected, and charger 30 that charges battery pack 100. While being mounted on bicycle 20, battery pack 100 is configured to supply electric power to driving motor 21 that drives bicycle 20. While being connected to charger 30, battery pack 100 is removed from bicycle 20 and connected to charger 30. While being mounted on bicycle 20, battery pack 100 supplies electric power to driving motor 21 to impart a driving force to bicycle 20.

In addition to charge FET 3, battery pack 100 shown in FIG. 1 includes discharge FET 4 configured to control discharging of battery 1. Charge FET 3 and discharge FET 4 are controlled to be turned on and off by control circuit 2. Control circuit 2 includes discriminating circuit 5 and memory 6. Discriminating circuit 5 is configured to detect a bicycle-mounted state in which battery pack 100 is mounted on bicycle 20 and a charger-connected state in which battery pack 100 is connected to charger 30. Memory 6 is implemented by, for example, a semiconductor memory. Memory 6 is configured to store a full charge voltage for stopping charging upon detecting that battery 1 having a voltage increase is fully charged.

Each of charge FET 3 and discharge FET 4 is a MOSFET connected to a parasitic diode as parallel diode 7. Each of charge FET 3 and discharge FET 4 may be implemented by an FET without a parasitic diode and a high-current diode that is a separate component connected in parallel to the FET, or a large-current diode may be connected in parallel to the parasitic diode. A diode exhibiting excellent large-current characteristics is used so that a large current can be supplied from battery 1 to driving motor 21. A diode that causes a low voltage drop is particularly suitable. However, in the case of a battery pack that turns on charge FET 3 to supply a large current from the FET to driving motor 21 while a large current is supplied from battery 1 to driving motor 21, the large current is supplied from the FET to the driving motor and therefore parallel diode 7 does not necessarily require large-current characteristics. Battery pack 100 shown in FIG. 1 includes an N-channel MOS for each of charge FET 3 and discharge FET 4. A P-channel FET may be used for each of the charge FET and the discharge FET.

Discriminating circuit 5 shown in the block diagram of FIG. 1 is connected to bicycle 20 via connecting terminal 12. Bicycle-side connecting terminal 22 is connected to ground line 24 via resistor 23. In battery pack 100, connecting terminal 12 is connected to power supply 14 via pull-up resistor 13. With additional reference to FIGS. 2, 3 and 4, discriminating circuit 5 is configured to detect the voltage of connecting terminal 12 so as to discriminate the bicycle-mounted state and the charger-connected state (Steps S11, S21, and S31). Regarding discriminating circuit 5, while battery pack 100 is connected to bicycle 20, the voltage of connecting terminal 12 becomes lower than the power supply voltage that is divided by pull-up resistor 13 and bicycle-side resistor 23. While battery pack 100 is connected to charger 30, the voltage of connecting terminal 12 is the power supply voltage because connecting terminal 12 is not connected to ground line 24. Accordingly, discriminating circuit 5 determines that a state in which the voltage of connecting terminal 12 is lower than the power supply voltage is the bicycle-mounted state (A in Steps S12, S22, and S32), and discriminating circuit 5 determines that a state in which the voltage of connecting terminal 12 is equal to the power supply voltage is the charger-connected state (B in Steps S12, S22, and S32).

While battery pack 100 is mounted on bicycle 20, driving motor 21 may serve as a generator to charge battery pack 100 due to, for example, regenerative braking. When battery pack 100 is charged, the voltage increases. When battery pack 100 is charged by the electromotive force of driving motor 21, the voltage of battery pack 100 increases. The increased voltage of battery pack 100 higher than a predetermined value deteriorates electrical characteristics, and further it may cause safety hazard. For example, lithium-ion batteries are often used suitably for battery pack 100 because they have light weight, small sizes, and capability of high charge/discharge capacity. When lithium-ion batteries are charged, the maximum voltage is set to a voltage ranging from 4.1 V to 4.2 V. However, when lithium-ion batteries are charged to a voltage exceeding the maximum voltage, both electrical characteristics and safety deteriorate.

Figure 2:
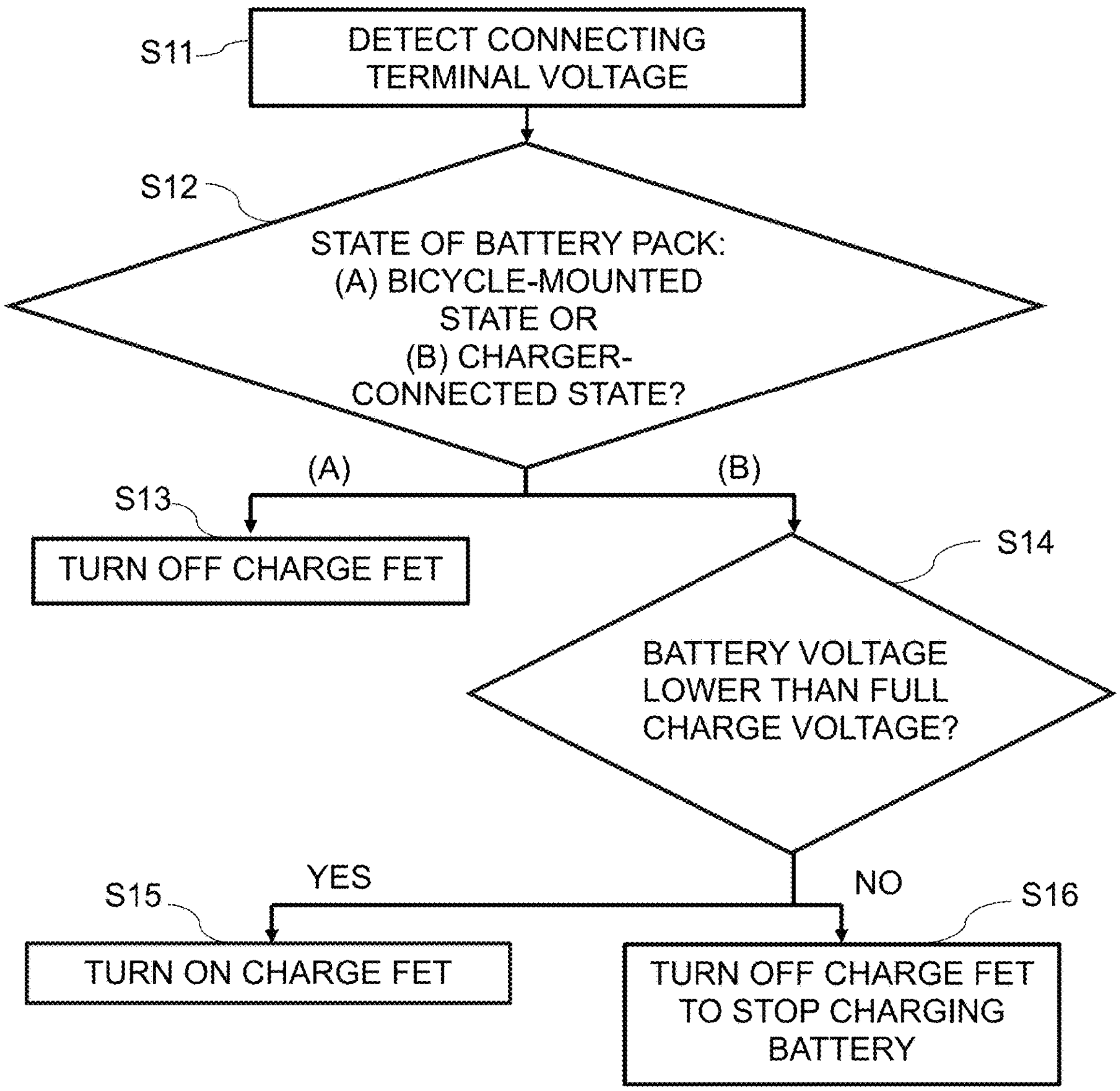
FIG. 2 is a flowchart describing operation of an control circuit according to one exemplary embodiment.

While discriminating circuit 5 detects the bicycle-mounted state, control circuit 2 of battery pack 100 shown in FIG. 1, and in particular, FIG. 2, turns off charge FET 3 (Step S13) so as to prevent battery 1 from being charged by the electromotive force of driving motor 21. When battery pack 100 is mounted on bicycle 20, charge FET 3 which is turned off prevents battery 1 from being charged by the electromotive force of driving motor 21, thus preventing battery pack 100 from being charged by the electromotive force from driving motor 21. Accordingly, in this state, the voltage of battery pack 100 does not increase, so that battery pack 100 can prevent battery 1 from deterioration due to the increase of the power supply voltage and prevent battery 1 from causing safety hazard. Discharge FET 4 is a switching element that supplies electric power from battery 1 to driving motor 21. Therefore, when this switching element is turned off, electric power cannot be supplied from battery 1 to driving motor 21 via the FET. It is an essential requirement of battery pack 100 that electric power is supplied from battery 1 to driving motor 21 while battery pack 100 is mounted on bicycle 20. Battery pack 100 as described above supplies electric power from battery 1 to driving motor 21 via parallel diode 7 while charge FET 3 is turned off. Parallel diode 7 is connected so as to pass electric current in a direction reverse to the forward direction of the FET to supply electric current from battery 1 to driving motor 21 with the FET which is turned off. Thus, battery pack 100 prevents battery 1 from being charged by the electromotive force of driving motor 21 with battery pack 100 being mounted on bicycle 20 while supplying electric power from battery 1 to driving motor 21, so as to prevent deterioration of battery 1 and ensure sufficient safety.

Control circuit 2 may turn off charge FET 3 whenever battery pack 100 is mounted on bicycle 20 as described above with reference to FIG. 2. However, in a further embodiment described below with reference to FIG. 3, control circuit 2 may turn on and off charge FET 3 according to the voltage of the battery to supply a large current from battery 1 to driving motor 21 and reduce electric power loss while preventing deterioration of battery 1 and safety degradation caused by abnormal voltage increase of battery 1. In battery pack 100, memory 6 of control circuit 2 stores a threshold voltage lower than the full charge voltage. The threshold voltage is determined taking into consideration the timing of the time lag of control circuit 2 switching charge FET 3 to turn off charge FET 3.

Figure 5:
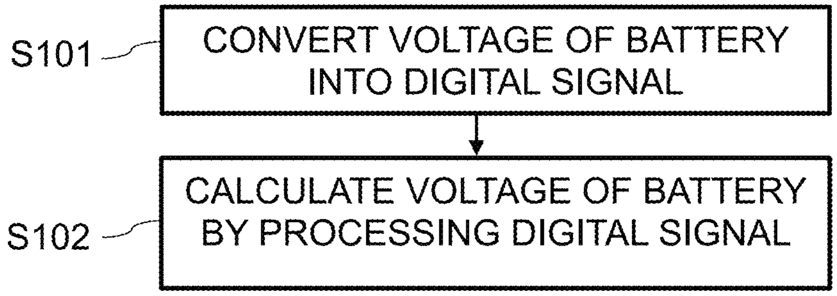
FIG. 5 is a flowchart describing signal processing for determining battery voltage.

Control circuit 2 compares the voltage of battery 1 with the threshold voltage lower than the full charge voltage (step S230), and switches charge FET 3 to turn off charge FET 3 when the voltage of battery 1 exceeds the threshold voltage. Therefore, in principle, the voltage of the battery does not exceed the threshold voltage. However, control circuit 2 detects the voltage of the battery, determines whether or not the detected voltage is higher than the threshold voltage, and then switches charge FET 3 to turn off charge FET 3 upon determining that the detected voltage is higher than the threshold voltage. For this reason, a time lag occurs before charge FET 3 is switched to be turned off after the voltage of battery 1 has exceeded the threshold voltage. In particular, with additional reference to FIG. 5, the time lag occurs before an analog signal of the detected battery voltage is converted by an A/D converter into a digital signal (Step S101), then the converted digital signal is processed (Step S102) to determine whether or not the battery voltage exceeds the threshold voltage, and charge FET 3 is switched to be turned off. Moreover, battery pack 100 calculates the battery voltage by averaging plural digital signals converted by the A/D converter at predetermined sampling periods in order to reduce errors due to noise or the like to detect the battery voltage accurately. Therefore, a time lag occurs in detecting the battery voltage. The threshold voltage is determined to be lower than the full charge voltage of battery 1 by a value ranging from 0.1 V to 0.3 V so that battery 1 is not charged by driving motor 21 and the battery voltage does not exceed the threshold voltage during the time lag before charge FET 3 is switched to be turned off after the battery voltage has been detected.

Control circuit 2 that stores the threshold voltage in memory 6 does not turn off charge FET 3 whenever battery pack 100 is mounted on bicycle 20. With specific reference to FIG. 3, while discriminating circuit 5 detects the bicycle-mounted state, control circuit 2 turns off charge FET 3 (Step S231) when the battery voltage is higher than the threshold voltage (VH in Step S230), but turns on charge FET 3 (Step S232) when the battery voltage is lower than the threshold voltage (VL in Step S230). Charge FET 3 which is turned on supplies electric power from battery 1 to driving motor 21 via the FET which is turned on without passing through parallel diode 7. The voltage drop due to parallel diode 7 is large, but the on-resistance of the FET which is turned on is significantly smaller, on the order of milliohms. Accordingly, even when a large current is supplied from battery 1 to driving motor 21, electric power loss caused by charge FET 3 is significantly small. Therefore, even when a large current is supplied from battery pack 100 to driving motor 21, electric power loss due to charge FET 3 is small so that electric power can be supplied efficiently from battery 1 to driving motor 21. Moreover, the amount of heat generated due to the Joule heat due to charge FET 3 is reduced so that the temperature increase of charge FET 3 can be reduced.

Charge FET 3 is switched to be turned on only when the battery voltage is lower than the threshold voltage predetermined to be a voltage lower than the full charge voltage. Therefore, even when charge FET 3 is turned on so that the electromotive force of driving motor 21 charges battery 1 and the battery voltage increases, the battery voltage does not rise to the full charge voltage during the time lag before control circuit 2 detects the increase of the battery voltage and switches charge FET 3 to turn off charge FET 3. This configuration prevents the battery deterioration due to the increased battery voltage exceeding the full charge voltage and also prevents the adverse effect of reduced safety.

Figure 3:
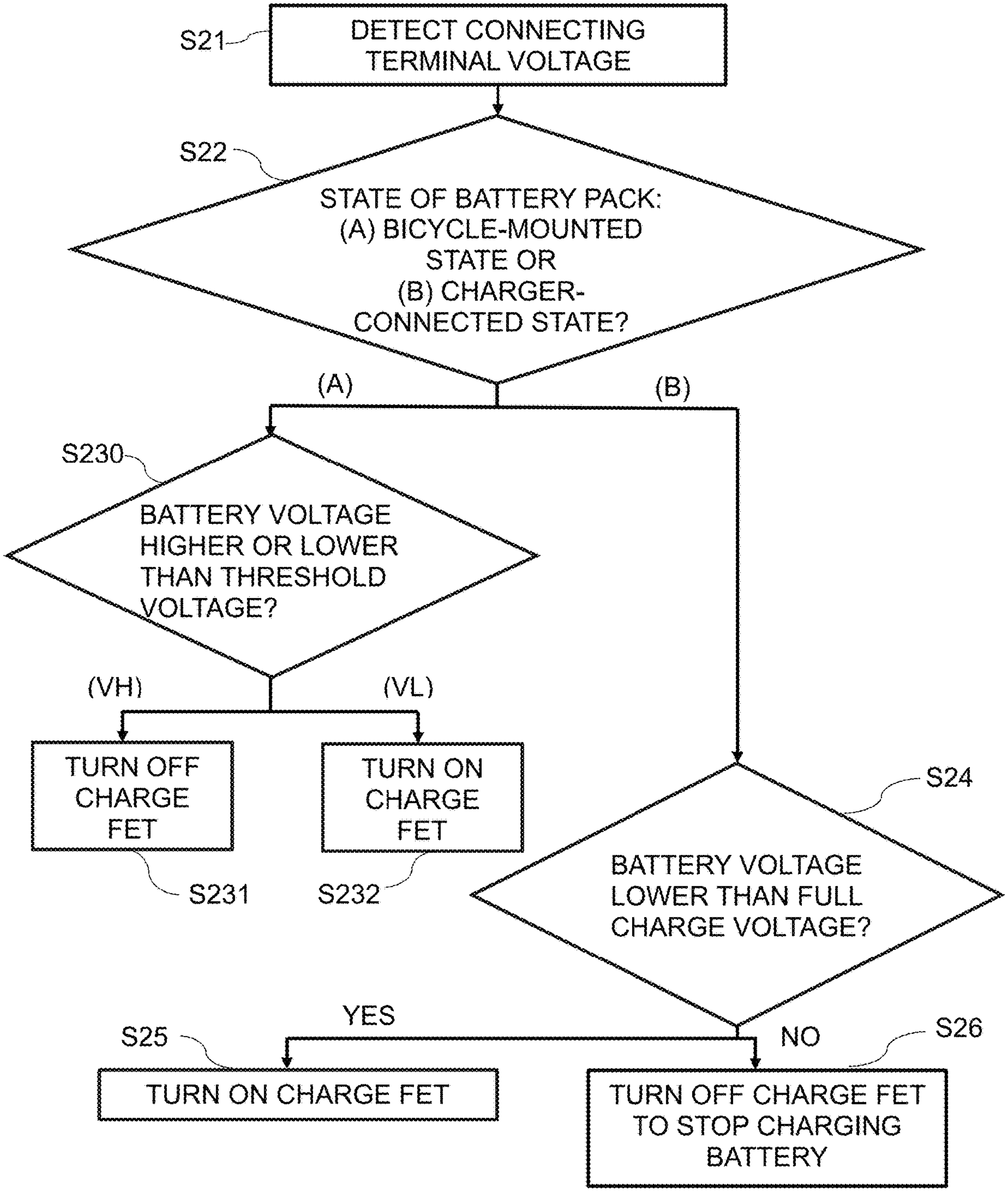
FIG. 3 is a flowchart describing operation of the control circuit according to another exemplary embodiment.
Figure 4:
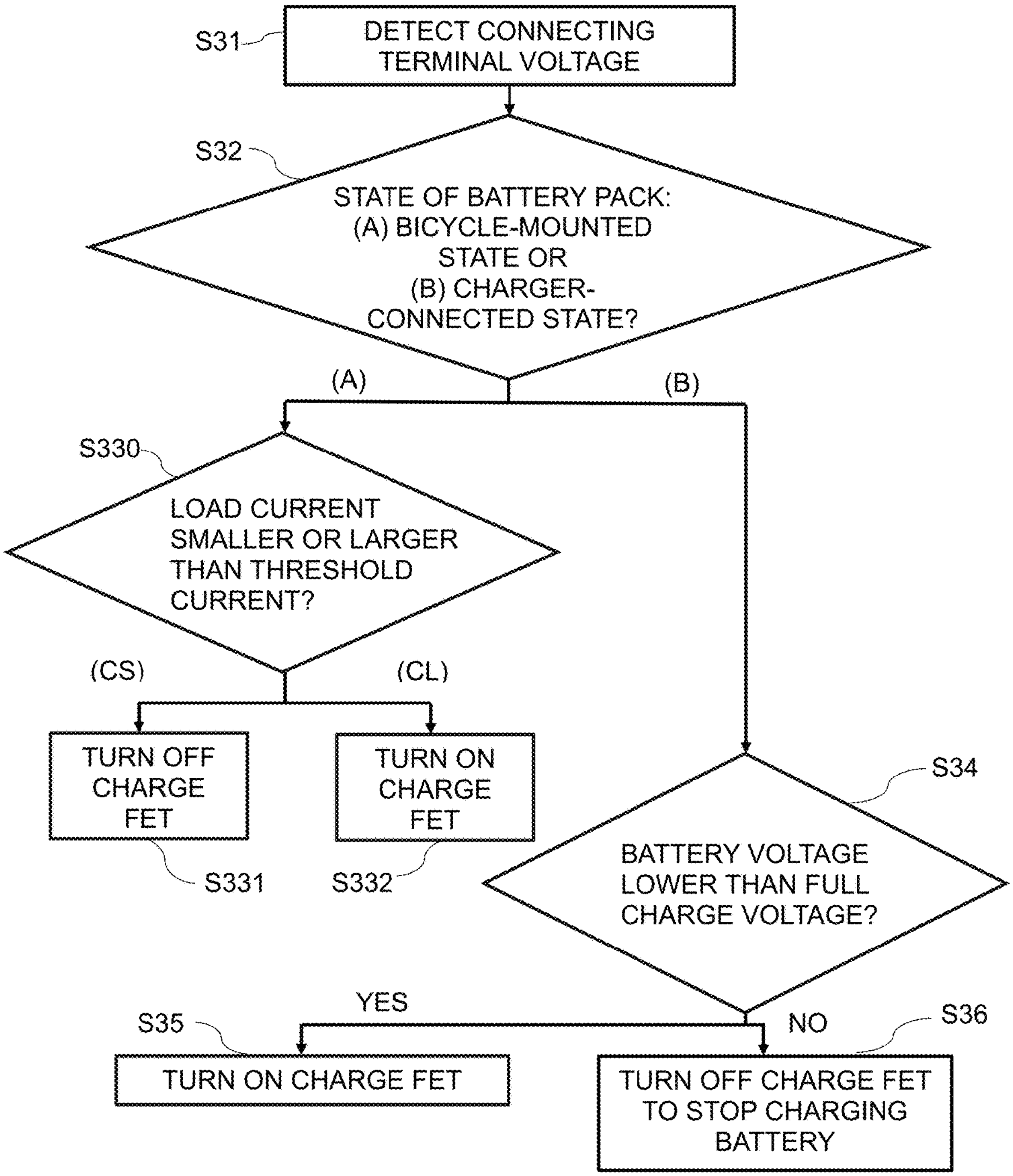
FIG. 4 is a flowchart describing operation of the control circuit according to yet another exemplary embodiment.

Control circuit 2 as describe above with reference to FIG. 3 switches charge FET 3 to turn on charge FET 3 while the battery voltage is lower than the threshold voltage. However, in a further embodiment described below with reference to FIG. 4, control circuit 2 may switch charge FET 3 to turn on charge FET only when the load current supplied from battery 1 to driving motor 21 exceeds a threshold current. Control circuit 2 stores a threshold current of the load current in memory 6. With specific reference to FIG. 4, while discriminating circuit 5 detects the bicycle-mounted state, control circuit 2 turns off charge FET 3 (Step S331) when the load current is smaller than the threshold current (CS in Step S330), but turns on charge FET 3 (Step S332) when the load current is larger than the threshold current (CL in Step S330). Battery pack 100 does not turn on charge FET 3 when the load current supplied from battery 1 to bicycle 20 is smaller than the threshold current, but turns on FET 3 only when a load current larger than the threshold current is supplied from battery 1 to bicycle 20. Therefore, battery pack 100 reduces electric power loss due to charge FET 3 and efficiently supply electric power from battery 1 to driving motor 21 while reliably preventing the voltage of battery 1 from exceeding the full charge voltage. When the load current exceeds the threshold current, battery pack 100 is discharged by supplying electric power from battery 1 to driving motor 21, and battery 1 is not charged by regenerative braking. Therefore, even when charge FET 3 is switched to be turned on under this condition, battery 1 is prevented from being charged by the electromotive force of driving motor 21 and the battery voltage is prevented from exceeding the full charge voltage, thus ensuring safety of battery 1. By turning on charge FET 3 when the load current is larger than the threshold current, electric power loss due to charge FET 3 is reduced when a large current is supplied from battery 1 to driving motor 21, and also, a large current is prevented from passing through the parallel diode to protect charge FET 3.

With further reference to FIGS. 1, 2, 3 and 4, while battery pack 100 is dismounted from bicycle 20 and connected to charger 30, discriminating circuit 5 detects the charger-connected state (B in Steps S12, S22, and S32). When the voltage of the battery charged by charger 30 is lower than the full charge voltage (YES in Steps S14, S24, and S34), charge FET 3 is turned on to charge battery 1 (Steps S15, S25, and S35). When detecting that the voltage of battery 1 being charged is higher than the full charge voltage (NO in Steps S14, S24, and S34), charge FET 3 is switched to be turned off to stop charging battery 1 (Steps S16, S26, and S36).

Battery pack 100 as described above is mounted on bicycle 20 and is used as a power supply for supplying electric power to driving motor 21 incorporated in bicycle 20. Electric bicycle 200 shown in FIG. 1 includes battery pack 100 and control converter 25 connected between battery pack 100 and driving motor 21. Control converter 25 controls electric power supplied from battery pack 100 to driving motor 21.

Driving motor 21 drives a wheel (not shown) with the electric power supplied from battery pack 100. Driving motor 21 is connected to battery pack 100 via control converter 25. The electric power supplied from battery pack 100 is controlled by control converter 25 to adjust the rotation torque of the wheel. Control converter 25 adjusts the electric power supplied to driving motor 21 based on the speed of the bicycle and the pedal rotation torque produced by the user as parameters. Control converter 25 controls the electric power supplied to driving motor 21 so that, for example, a ratio of a pedal rotation torque and the torque at which driving motor 21 rotates the wheel is a predetermined ratio.

Since bicycle 20 that performs regenerative braking with driving motor 21 performs braking by charging battery pack 100 by the electric power generated by driving motor 21, a charging current flows through battery pack 100 during regenerative braking. Because the charging current may cause the adverse effect on battery 1 of battery pack 100, battery pack 100 includes a circuit configured to limit the charging current produced by regenerative braking of the bicycle.

INDUSTRIAL APPLICABILITY

The present invention is suitably used for a battery pack that supplies electric power to a driving motor of an electric bicycle, particularly for an electric bicycle equipped with a mechanism of charging the battery pack by performing regenerative braking during braking.

REFERENCE MARKS IN THE DRAWINGS

100 battery pack
200 electric bicycle
1 battery
2 control circuit
3 charge FET
4 discharge FET
5 discriminating circuit
6 memory
7 parallel diode
12 connecting terminal
13 pull-up resistor
14 power supply
20 bicycle
21 driving motor
22 connecting terminal
23 resistor
24 ground line
25 control converter
30 charger

The invention claimed is:

1. A battery pack for an electric bicycle, the battery pack comprising:
- a battery which is rechargeable;
- a charge FET including a parallel diode connected in series with the battery; and
- a control circuit configured to turning on and off of controlling the charge FET, wherein
- the control circuit includes:
  - a discriminating circuit configured to detect a bicycle-mounted state and a charger-connected state; and
  - a memory configured to store a full charge voltage of the battery and a threshold voltage lower than the full charge voltage, and
- the control circuit is configured to:
- in response to the discriminating circuit detecting the bicycle-mounted state, cause the charge FET to turn on or off depending on whether a voltage of the battery is higher than the threshold voltage, wherein
  - the control circuit turns off the charge FET where the voltage of the battery is higher than the threshold voltage; and
  - the control circuit turns on the charge FET where the voltage of the battery is lower than the threshold voltage; and
- in response to the discriminating circuit detecting the charger-connected state, cause the charge FET to turn on or off depending on whether the voltage of the battery is higher than the full charge voltage, wherein the control circuit stops charging the battery by switching the charge FET to turn off the charge FET upon detecting that the voltage of the battery charged by a charger becomes higher than the full charge voltage.

2. The battery pack according to claim 1, wherein the control circuit includes an A/D converter configured to convert the voltage of the battery into a digital signal, and the control circuit is configured to calculate the voltage of the battery by processing the digital signal converted by the A/D converter.

3. The battery pack according to claim 1, wherein the charge FET is a MOSFET including a parasitic diode as the parallel diode.

4. An electric bicycle comprising:

the battery pack according to claim 1; and a driving motor connected to the battery pack via a control converter, the driving motor configured to supply a charging current to the battery pack during regenerative braking of the bicycle.

5. An electric bicycle comprising:

the battery pack according to claim 1;

a driving motor connected to the battery pack via a control converter; and a regenerative braking power generating mechanism configured to charge the battery pack with an electromotive force of the driving motor.

6. A battery pack for an electric bicycle including a driving motor, the battery pack comprising:

a battery which is rechargeable;

a charge FET including a parallel diode connected in series with the battery; and a control circuit configured to control turning on and off of the charge FET, wherein the control circuit includes:

a discriminating circuit configured to detect a bicycle-mounted state and a charger-connected state; and a memory configured to store a full charge voltage of the battery and a threshold current of a load current supplied to the driving motor; and the control circuit is configured to:

in response to the discriminating circuit detecting the bicycle-mounted state, cause the charge FET to turn on or off depending on the load current supplied to the driving motor of the electric bicycle from the battery, wherein the control circuit turns off the charge FET so as to prevent the battery from being charged with an electromotive force of the motor when the load current supplied to the driving motor is smaller than the threshold current; and the control circuit turns on the charge FET when the load current supplied to the driving motor is larger than the threshold current, and in response to the discriminating circuit detecting the charger-connected state, cause the charge FET to turn on or off depending on the voltage of the battery, wherein the control circuit stops charging the battery by switching the charge FET to turn off the charge FET upon detecting that the voltage of the battery charged by a charger is higher than the full charge voltage.

7. The battery pack according to claim 6, wherein the control circuit includes an A/D converter configured to convert the voltage of the battery into a digital signal, and the control circuit is configured to calculate the voltage of the battery by processing the digital signal converted by the A/D converter.

8. The battery pack according to claim 6, wherein the charge FET is a MOSFET including a parasitic diode as the parallel diode.

9. An electric bicycle comprising:

the battery pack according to claim 3; and the driving motor connected to the battery pack via a control converter, the driving motor configured to supply a charging current to the battery pack during regenerative braking of the bicycle.

10. An electric bicycle comprising:

the battery pack according to claim 6;

a driving motor connected to the battery pack via a control converter; and the regenerative braking power generating mechanism configured to charge the battery pack with an electromotive force of the driving motor.

11. The battery pack according to claim 6, wherein the control circuit is configured to:

supply electric power from the battery to the driving motor via the parallel diode while turning off the discharge FET when the load current supplied to the driving motor is smaller than the threshold current; and supply electric power from the battery to the driving motor while turning on the charge FET when the load current supplied to the driving motor is larger than the threshold current.

* * * * *